US012773766B2

(12) United States Patent
Brasel et al.

(10) Patent No.: US 12,773,766 B2
(45) Date of Patent: *Oct. 27, 2026

(54) GAS SPRING-POWERED FASTENER DRIVER

(71) Applicant: MILWAUKEE ELECTRIC TOOL CORPORATION, Brookfield, WI (US)

(72) Inventors: Alex J. Brasel, Greenfield, WI (US); Garrett C. Waldron, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/082,420

(22) Filed: Mar. 18, 2025

(65) Prior Publication Data

US 2025/0214213 A1 Jul. 3, 2025

Related U.S. Application Data

(63) Continuation of application No. 18/138,968, filed on Apr. 25, 2023, now Pat. No. 12,263,569.

(Continued)

(51) Int. Cl.
*B25C 1/04* (2006.01)

(52) U.S. Cl.
CPC .................................... *B25C 1/047* (2013.01)

(58) Field of Classification Search
CPC ...................................................... B25C 1/047
See application file for complete search history.

(56) References Cited

U.S. PATENT DOCUMENTS 2,872,901 A * 2/1959 Goldring ................. B25C 1/041 91/417 R
3,190,187 A * 6/1965 Doyle ..................... B25C 1/045 91/468

(Continued)

FOREIGN PATENT DOCUMENTS

CN 111015598 A * 4/2020 ............... B25C 1/04
CN 210232909 U 4/2020

(Continued)

*Primary Examiner* — Lucas E. A. Palmer
(74) *Attorney, Agent, or Firm* — Michael Best & Friedrich LLP

(57) ABSTRACT

A gas spring-powered fastener driver includes a cylinder configured to contain a pressurized gas therein, a piston disposed within and movable along the cylinder, a driver blade attached to the piston and moveable therewith between a top-dead-center (TDC) position and a bottom-dead-center (BDC) position, the driver blade configured to drive a fastener when moved from the TDC position toward the BDC position, and a two-way valve in fluid communication with the cylinder. The two-way valve is configured to selectively permit an inbound flow of gas into the cylinder, permit an outbound flow of gas from the cylinder, and seal the cylinder to inhibit both inbound flow and outbound flow of gas from the cylinder. The two-way valve includes an interior end in fluid communication with the cylinder, an exterior end in selective fluid communication with the surroundings of the gas spring-powered fastener driver, and a sealing area.

20 Claims, 8 Drawing Sheets

Related U.S. Application Data

(60) Provisional application No. 63/339,734, filed on May 9, 2022.

(56) References Cited

U.S. PATENT DOCUMENTS 3,605,559 A * 9/1971 Korth ........................ B27F 7/34 91/410
3,708,096 A * 1/1973 Burke, Jr. ............... B25C 1/043 227/130
3,964,659 A * 6/1976 Eiben ...................... B25C 1/043 227/7
4,040,554 A * 8/1977 Haytayan ................ F16B 15/08 227/8
4,075,850 A * 2/1978 Nakazato .................. F01L 9/10 60/633
4,280,248 A * 7/1981 Herubel ................... A22B 3/02 124/75
4,346,831 A * 8/1982 Haytayan ................ B25C 1/008 227/8
4,554,861 A * 11/1985 Gassner .................. B25C 1/041 91/410
5,135,152 A * 8/1992 Uno ........................ B25C 1/005 227/116
5,669,542 A * 9/1997 White ..................... B25C 1/043 91/308
5,671,880 A * 9/1997 Ronconi ................. B25C 1/042 91/308
5,873,510 A * 2/1999 Hirai ....................... B25C 1/043 227/8
6,095,394 A * 8/2000 Wang-Kuan ............ B25C 1/045 173/114
7,341,174 B1 * 3/2008 Wen ........................ B25C 1/041 227/8
11,185,967 B2 * 11/2021 Oouchi ................... B25C 1/043
2004/0020964 A1 * 2/2004 Lee ......................... B25C 1/042 227/130
2004/0026475 A1 * 2/2004 Ohmori ..................... B25C 1/08 227/130
2004/0238590 A1 * 12/2004 Ishizawa ................. B25C 1/046 227/8
2005/0040205 A1 * 2/2005 Haytayan ................ B25C 1/042 227/130
2007/0119899 A1 * 5/2007 Ronconi ................. B25C 1/042 227/130
2011/0192879 A1 * 8/2011 Zhang ..................... B25C 1/041 227/156
2011/0198380 A1 * 8/2011 Kitagawa ................ B25C 1/041 227/2
2011/0290850 A1 * 12/2011 Wu ........................... B25C 1/04 227/130
2012/0000031 A1 * 1/2012 Liu ........................... B25C 1/08 15/339
2012/0061445 A1 * 3/2012 Liu ......................... B25C 1/042 227/130
2015/0197001 A1 * 7/2015 Li ........................... B25C 1/047 227/130
2017/0209995 A1 * 7/2017 Iijima ..................... B25C 1/043
2019/0022841 A1 * 1/2019 Kamimoto .............. B25C 1/047
2020/0306940 A1 * 10/2020 Theberath ............... B25C 1/043
2020/0406439 A1 12/2020 Fujimoto et al.
2021/0237242 A1 * 8/2021 Carrier .................... B25C 1/047
2022/0212326 A1 * 7/2022 Tanaka .................... B25C 1/043
2025/0025994 A1 * 1/2025 Sutherland .............. B25C 1/008

FOREIGN PATENT DOCUMENTS

EP 3698925 A1 8/2020
WO 2017055236 A1 4/2017

* cited by examiner

GAS SPRING-POWERED FASTENER DRIVER

CROSS-REFERENCE TO RELATED APPLICATIONS

This application is a continuation of U.S. patent application Ser. No. 18/138,968, filed Apr. 25, 2023, now U.S. Pat. No. 12,263,569, which claims priority to U.S. Provisional Patent Application No. 63/339,734, filed May 9, 2022, the entire contents of all of which are incorporated herein by reference.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art, such as by compressed air.

SUMMARY OF THE INVENTION

The present invention provides a gas spring-powered fastener driver including: a cylinder configured to contain a pressurized gas therein; a piston disposed within and movable along the cylinder; a driver blade attached to the piston and moveable therewith between a top-dead-center (TDC) position and a bottom-dead-center (BDC) position, the driver blade configured to drive a fastener when moved from the TDC position toward the BDC position; and a two-way valve in fluid communication with the cylinder, the two-way valve configured to selectively permit an inbound flow of gas into the cylinder from an external pressurized gas source, permit an outbound flow of gas from the cylinder, and seal the cylinder to inhibit both inbound flow and outbound flow of gas from the cylinder; wherein the two-way valve includes an interior end in fluid communication with the cylinder, an exterior end in selective fluid communication with the surroundings of the gas spring-powered fastener driver, and a sealing area disposed between the interior end and the exterior end.

The present invention provides, in yet another aspect, a gas spring-powered fastener driver including: a cylinder configured to contain a pressurized gas therein; a piston disposed within and moveable along the cylinder; a driver blade attached to the piston and moveable therewith between a top-dead-center (TDC) position and a bottom-dead-center (BDC) position, the driver blade configured to drive a fastener when moved from the TDC position toward the BDC position; and a valve in fluid communication with the cylinder, the valve including a valve body, an inlet seal configured to selectively permit an inbound flow of gas from an external pressurized gas source into the cylinder, the inlet seal being biased toward a sealed position by pressurized gas within the cylinder, and an annular outlet seal configured to selectively permit an outbound flow of gas from the cylinder, the outlet seal being biased toward a sealed position by a compression spring, wherein a radially outer edge of the annular outlet seal is engaged with the valve body when the outlet seal is in the sealed position, and wherein the inlet seal is engaged with the annular outlet seal when the inlet seal is in the sealed position.

The present invention provides, in yet another aspect, a gas spring-powered fastener driver including: a cylinder configured to contain a pressurized gas therein; a piston disposed within and movable along the cylinder; a driver blade attached to the piston and moveable therewith between a top-dead-center (TDC) position and a bottom-dead-center (BDC) position, the driver blade configured to drive a fastener when moved from the TDC position toward the BDC position; and a valve coupled to the cylinder, the valve including a plunger moveable between a sealed position, a filling position in which an inbound flow of gas is permitted into the cylinder, and an exhausting position in which an outbound flow of gas is permitted from the outer cylinder.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
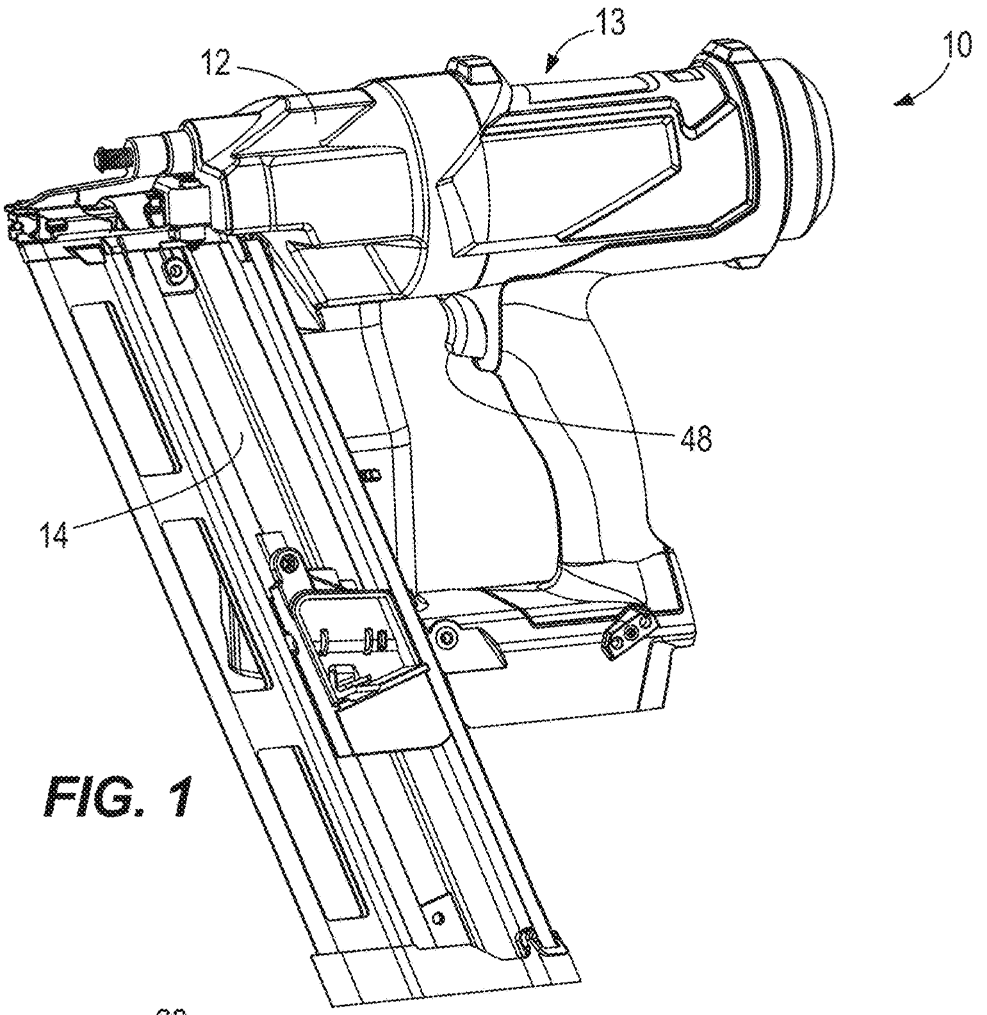
FIG. 1 is perspective view of a gas spring-powered fastener driver in accordance with an embodiment of the invention.
Figure 2:
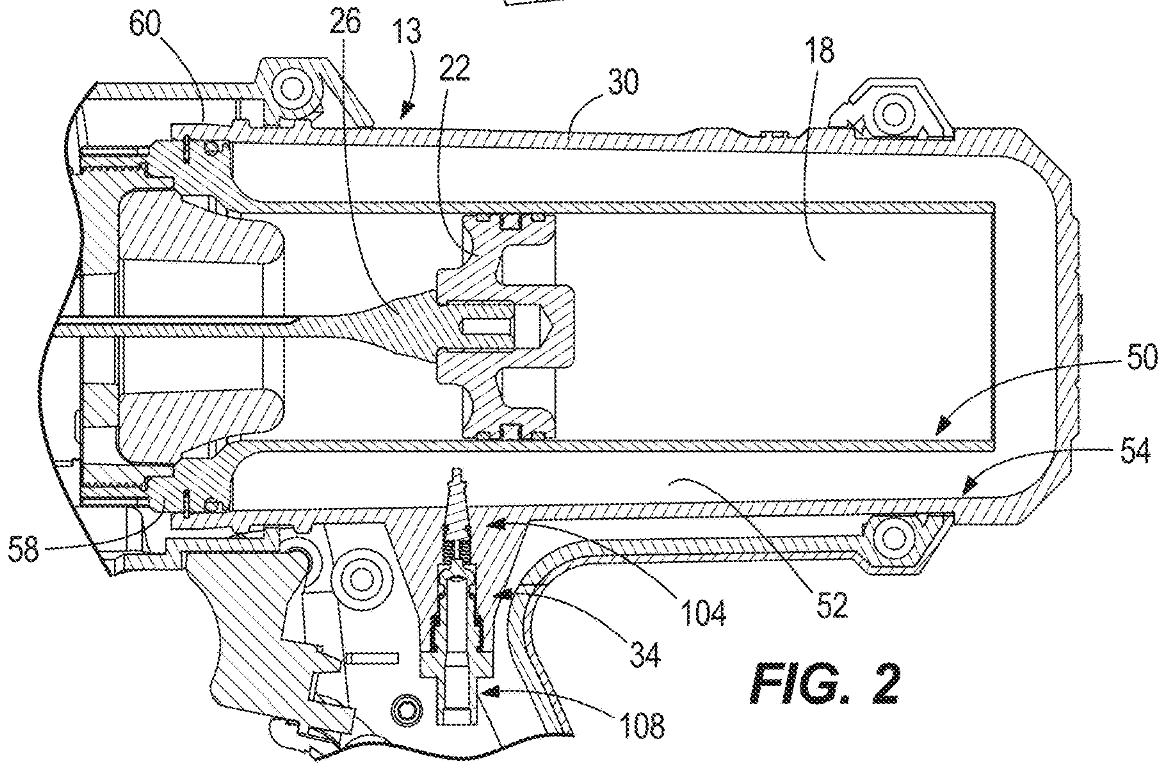
FIG. 2 is a partial section view of the gas spring-powered fastener driver of FIG. 1.
Figure 3:
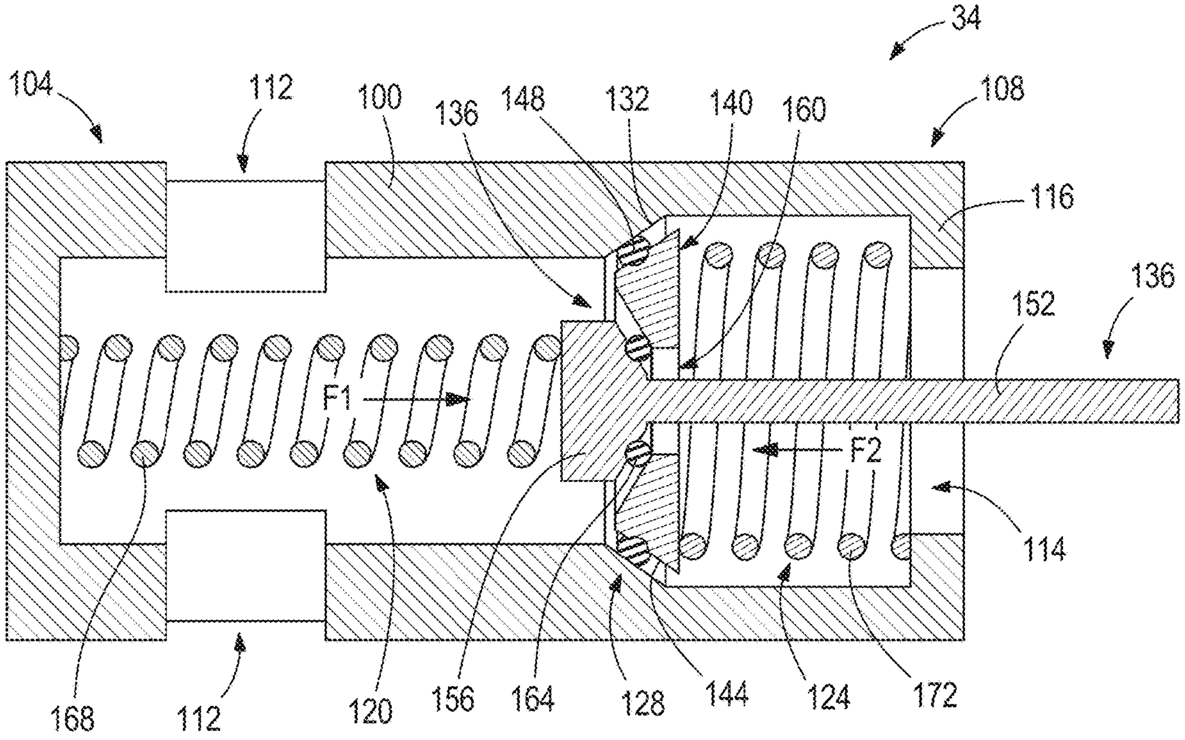
FIG. 3 is a section view of an integrated fill and pressure release valve according to one embodiment of the present disclosure.

With reference to FIGS. 1 and 2, a gas spring-powered fastener driver 10 is operable to drive fasteners (e.g., nails, tacks, staples, etc.) held within a magazine 14 into a workpiece. The fastener driver 10 includes a housing 12 having a cylinder support portion 13 in which an inner cylinder 18 is disposed. A piston 22 is positioned within the inner cylinder 18 (FIG. 2) and moveable along the cylinder 18. The fastener driver 10 further includes a driver blade 26 that is attached to the piston 22 and moveable therewith. The fastener driver 10 does not require an external source of air pressure, but rather includes an outer cylinder or storage chamber cylinder 30 of pressurized gas in fluid communication with the cylinder 18. In the illustrated embodiment, the cylinder 18 and moveable piston 22 are positioned within the storage chamber cylinder 30. In some embodiments, the cylinder 18 may be positioned adjacent the storage chamber cylinder 30 and in fluid communication with the storage chamber cylinder 30. With reference to FIG. 2, the driver 10 further includes a valve 34 coupled to the storage chamber cylinder 30. As will be described in greater detail herein, the valve 34 regulates a pressure of the gas within the storage chamber cylinder 30. And, when connected with a source of compressed gas, the valve 34 also permits the storage chamber cylinder 30 to be refilled with compressed gas if any prior leakage has occurred. Accordingly, a bi-directional flow of compressed gas is selectively permitted through the valve 34, making the valve 34 operable as both a gas inlet valve and a pressure-regulating valve.

Together, the cylinder 18 and the driver blade 26 define a driving axis. During a driving cycle, the driver blade 26 and piston 22 are moveable between a top-dead-center (TDC) position and a driven or bottom-dead-center (BDC) position along the driving axis. The fastener driver 10 further includes a lifting assembly (not shown), which is operable to move the driver blade 26 from the driven position toward the TDC position.

In operation, the lifting assembly drives the piston 22 and the driver blade 26 toward the TDC position. As the piston 22 and the driver blade 26 are driven toward the TDC position, the gas above the piston 22 and within the storage chamber cylinder 30 is compressed. Prior to reaching the TDC position, the piston 22 and the driver blade 26 are held in a ready position, which is located between the TDC and the BDC or driven positions, until being released by user activation of a trigger 48 (FIG. 1). When released, the compressed gas above the piston 22 and within the storage chamber cylinder 30 drives the piston 22 and the driver blade 26 to the driven position, thereby driving a fastener into the workpiece. The illustrated fastener driver 10 therefore operates on a gas spring principle utilizing the lifting assembly and the piston 22 to repeatedly compress the gas within the cylinder 18 and the storage chamber cylinder 30 for consecutive fastener driving operations.

With reference to FIG. 2, the storage chamber cylinder 30 is concentric with the cylinder 18. The cylinder 18 has an annular inner wall 50 configured to guide the piston 22 and driver blade 26 along the driving axis to compress the gas in the cylinder 18 and the storage chamber cylinder 30. The storage chamber cylinder 30 has an annular outer wall 54 circumferentially surrounding the inner wall 50. The cylinder 18 has a connecting section 58. The storage chamber cylinder 30 has corresponding connecting section at a lower end 60 of the storage chamber cylinder 30 such that the cylinder 18 is coupled to the storage chamber cylinder 30 at the lower end 60. In the illustrated embodiment, the connecting section 58 is a securement ring. In other embodiments, the connecting section 58 is a threaded connection. As such, the cylinder 18 is configured to be axially secured to the storage chamber cylinder 30. A threaded coupling may facilitate and simplify assembly of the driver 10.

Gas spring-powered fastener drivers such as those described herein must be able to accommodate for overpressure and/or high temperature conditions. An overpressure situation is when the pressure in the storage chamber cylinder 30 exceeds a threshold value that denotes an upper limit of an operating range. Traditionally, the storage chamber cylinder 30 is designed to crack as a controlled failure if pressure in the cylinder 30 exceeds the threshold value. The crack allows pressurized air to escape, which renders traditional gas-spring powered fastener driver unusable after the over-pressure situation. In the gas spring-powered fastener driver 10 disclosed herein, the storage chamber cylinder 30 can be re-filled after exhausting gas through the valve 34 due to an overpressure condition. As will be described in greater detail below, the valve 34 of the present disclosure is a two-way valve. The two-way valve allows pressurized air, when above the threshold value, to be exhausted through the valve 34 in a first direction and allows compressed air to flow through the valve 34 in a second direction to refill the storage chamber cylinder 30 with pressurized air.

FIGS. 3-6 illustrate the valve 34 according to one embodiment of the present disclosure. The valve 34 includes a cylindrical valve body 100 having an interior end 104 and an exterior end 108. The interior end 104 is disposed within the storage chamber cylinder 30, while the exterior end 108 extends beyond the storage chamber cylinder 30 (FIG. 2). The interior end 104 includes at least one aperture 112 that allows for fluid communication between a storage chamber 52 defined between the cylinders 18, 30 and an interior of the valve body 100. In the illustrated embodiment, the interior end 104 includes two opposing apertures 112. However, the interior end 104 may include more or fewer apertures 112. The exterior end 108 includes an opening 114 in an axial end face 116 of the body 100 that allows for fluid communication between the interior of the valve body 100 and the atmosphere.

The interior of the valve body 100 extends along a length of the valve body 100 and includes a sealed portion 120 and an atmospheric portion 124. The sealed portion 120 corresponds to the interior end 104 and is in fluid communication with the storage chamber 52 via the apertures 112. The atmospheric portion 124 corresponds to the exterior end 108 and is in fluid communication with the atmosphere via the opening 114. A sealing area 128 separates the sealed portion 120 from the atmospheric portion 124. In the illustrated embodiment, the sealed portion 120 is smaller in diameter than the atmospheric portion 124. Therefore, a tapered wall 132 is formed at the sealing area 128 to transition between the sealed portion 120 and the atmospheric portion 124. Disposed within the sealing area 128 are an inlet seal 136 and an outlet seal 140. The inlet seal 136 selectively allows compressed gas to flow into the storage chamber 52 through the valve 34, and the outlet seal 140 selectively allows compressed gas to flow out of the storage chamber 52 through the valve 34. In the illustrated embodiment, the outlet seal 140 is annular and includes a tapered radially outer edge 144 engageable with the tapered wall 132. The engagement between the outlet seal 140 and the wall 132 forms a first sealing surface. In some embodiments, an outer seal member 148, such as an O-ring, is disposed on the tapered radially outer edge 144 of the outlet seal 140 or the tapered wall 132 to assist in sealing the outlet seal 140 and the wall 132.

In the illustrated embodiment, the inlet seal 136 includes a stem 152 having a protrusion 156 at one end of the stem 152. The stem 152 extends through a central aperture 160 in the annular outlet seal 140, and the protrusion 156 is shaped to engage the outlet seal 140 to selectively seal the central aperture 160. Engagement between the protrusion 156 and the outlet seal 140 forms a second sealing surface. In some embodiments, an inner seal member 164, such as an O-ring, is disposed on the protrusion 156 or the outlet seal 140 to assist in sealing between the central aperture 160 of the outlet seal 140 and the protrusion 156.

The valve 34 further includes a sealed portion biasing member 168 disposed within the sealed portion 120 and an atmospheric portion biasing member 172 disposed within the atmospheric portion 124. The sealed portion biasing member 168 of the illustrated embodiment is a compression spring seated between the valve body 100 and the protrusion 156 of the inlet seal 136. The sealed portion biasing member 168 applies a biasing force F1 on the inlet seal 136 in a direction that maintains the seal between the protrusion 156 and the central aperture 160 of the outlet seal 140. The atmospheric portion biasing member 172 of the illustrated embodiment is also a compression spring. The atmospheric portion biasing member 172 is seated at one end to the valve body 100, proximate the opening 114 in the axial end face 116, and at another end to the outlet seal 140. The atmospheric portion biasing member 172 applies a biasing force F2 on the outlet seal 140 in a direction that maintains the seal between the outlet seal 140 and the tapered wall 132. The sealed portion biasing member 168 and the atmospheric portion biasing member 172 apply biasing forces in opposite directions.

Figure 4:
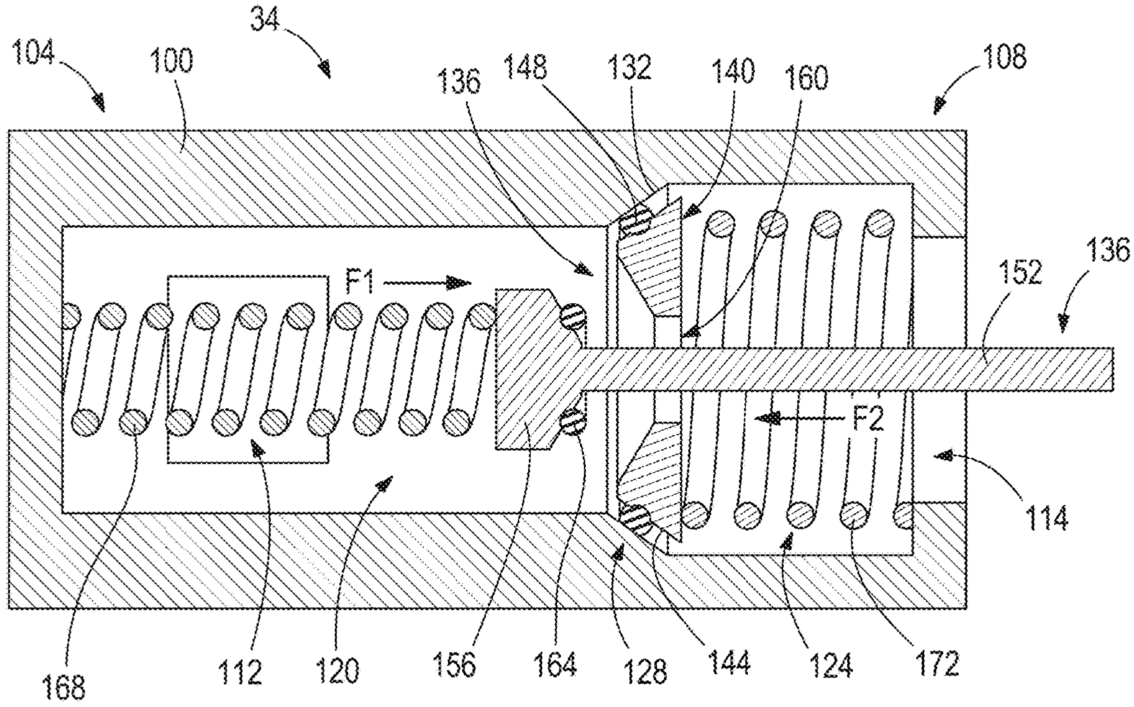
FIG. 4 illustrates the valve of FIG. 3 in a filling position.
Figure 5:
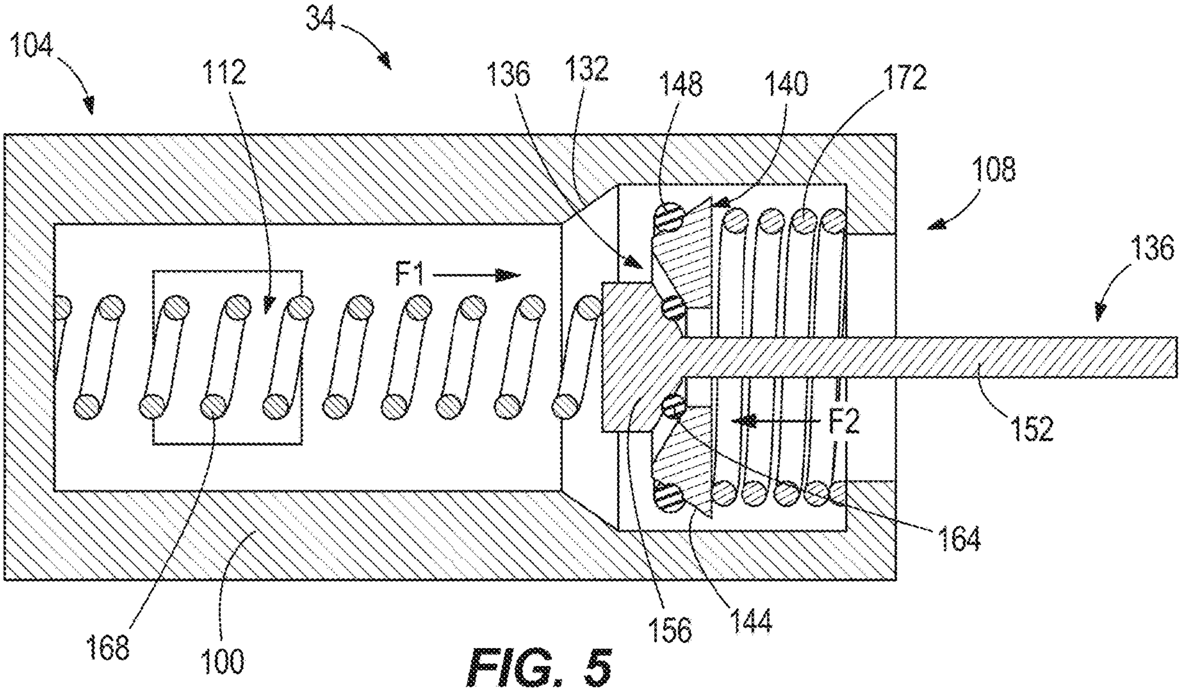
FIG. 5 illustrates the valve of FIG. 3 in an exhausting position, with certain components hidden for clarity.
Figure 6:
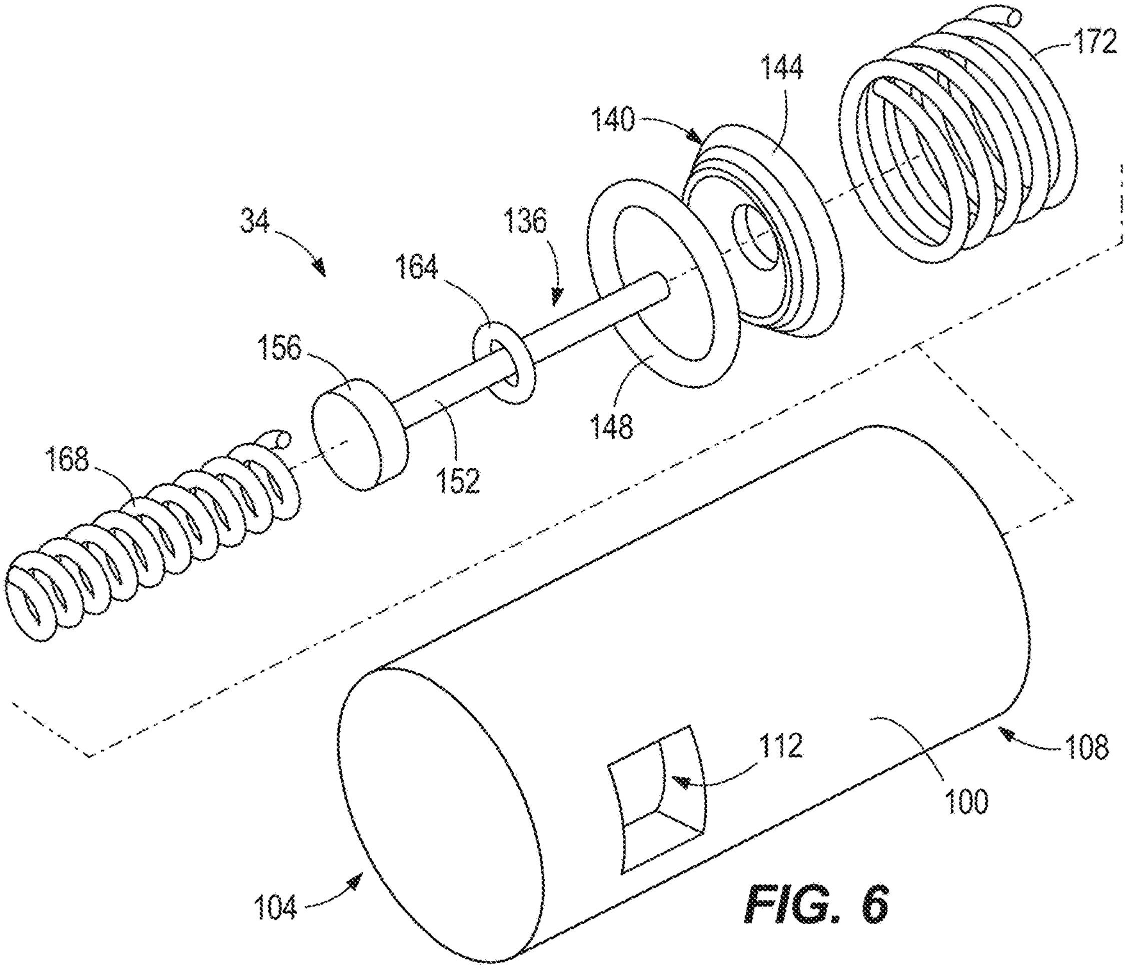
FIG. 6 is an exploded perspective view of the valve of FIG. 3.

To fill the storage chamber 52, compressed gas is allowed to flow through the valve 34 by moving the inlet seal 136 against the biasing force F1 of the sealed portion biasing member 168, thereby breaking the seal between the protrusion 156 and the outlet seal 140 (FIG. 4). When filled, the inlet seal 136 is moved back into sealing engagement with the outlet seal 140 by the sealed portion biasing member 168. In an overpressure situation, the compressed gas within the sealed portion 120 applies a force on the outlet seal 140 that overcomes the biasing force F2 of the atmospheric portion biasing member 172, breaking the seal between the outlet seal 140 and the tapered wall 132 and allowing pressurized gas to escape the storage chamber 52 through the valve 34, thereby decreasing the pressure within the storage chamber 52 (FIG. 5). When the pressure decreases to a point below the threshold value (e.g., no longer in overpressure), the biasing force F2 from the atmospheric portion biasing member 172 re-engages the outlet seal 140 with the tapered wall 132. The valve 34 of the above-described embodiment is a double spring, dual-action valve capable of independently controlling inlet and exhaust gas flow.

Figure 7:
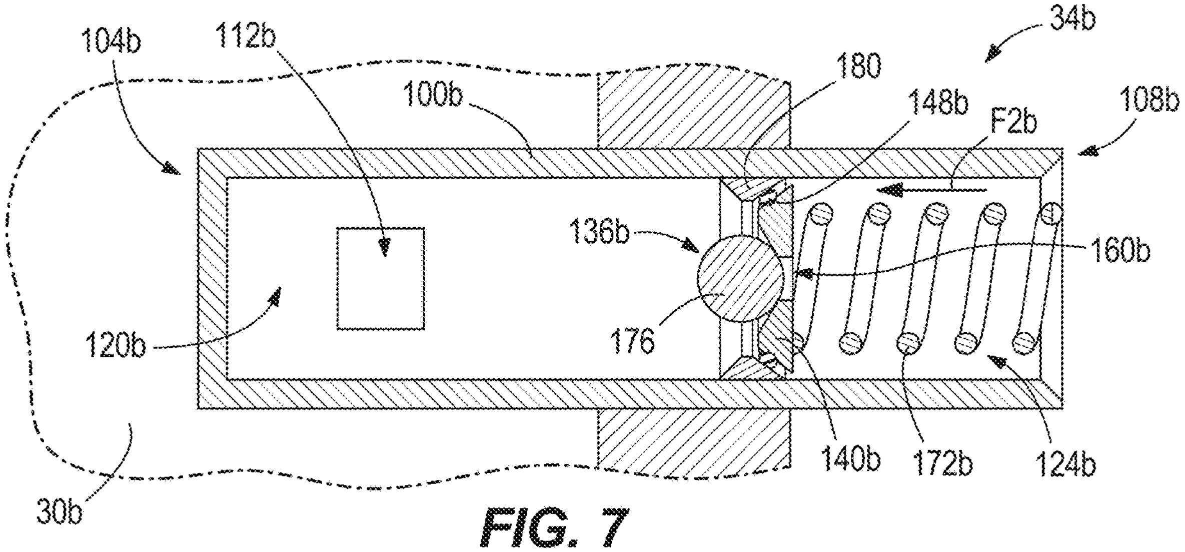
FIG. 7 is a section view of an integrated fill and pressure release valve according to another embodiment of the present disclosure.
Figure 8:
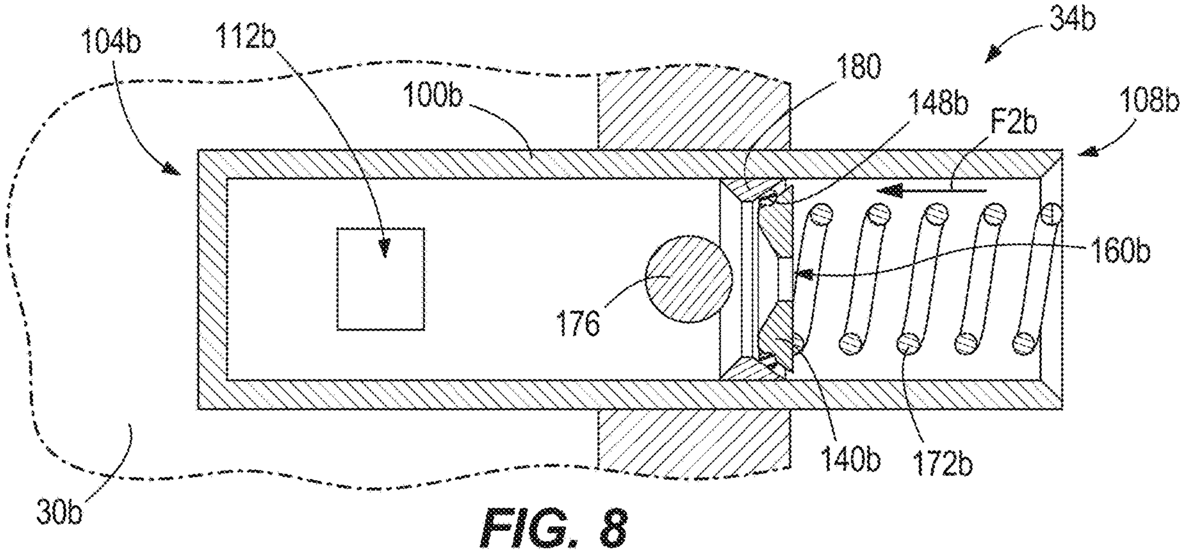
FIG. 8 illustrates the valve of FIG. 7 in a filling position.
Figure 9:
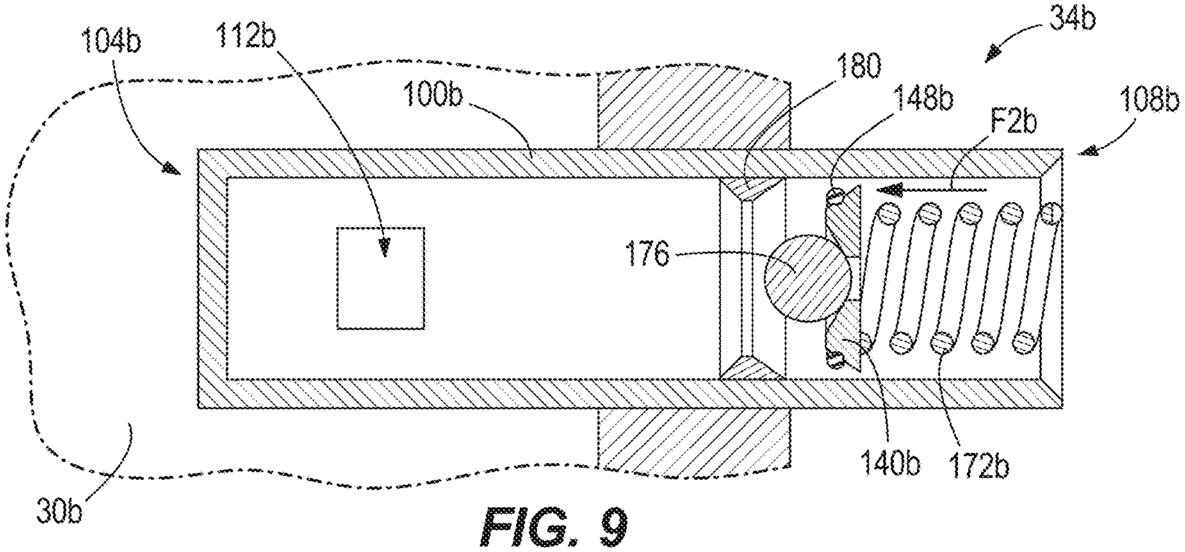
FIG. 9 illustrates the valve of FIG. 7 in an exhausting position.

FIGS. 7-9 illustrate a valve 34*b* according to another embodiment of the present disclosure, with like parts having like reference numerals plus the letter "b" appended thereon, and the following differences explained below. The valve 34*b* is a ball-seat valve. Therefore, the inlet seal 136*b* is formed as a sphere or ball 176, rather than a stem and protrusion. The ball 176 is sized to seal the central aperture 160*b* within the outlet seal 140*b*, and the ball 176 is held in place due by the pressure of the compressed gas in the storage chamber 52*b*. In other words, the inlet seal 136*b* is biased towards a sealed position due to the gas pressure within the system, and the valve 34*b* does not include a sealed portion biasing member. Furthermore, the sealed portion 120*b* and the atmospheric portion 124*b* have similar diameters. Rather than a tapered wall forming a transition, the valve 34*b* includes a radially inward-extending circumferential protrusion 180 to engage the outlet seal 140*b*. Like the double-spring dual-action valve 34, when pressure in the storage chamber 52*b* exceeds a threshold value, the outlet seal 140*b* and the ball 176 move in unison against the biasing force of the atmospheric portion biasing member 172*b* to allow pressurized gas to be exhausted (FIG. 9).

Figure 10:
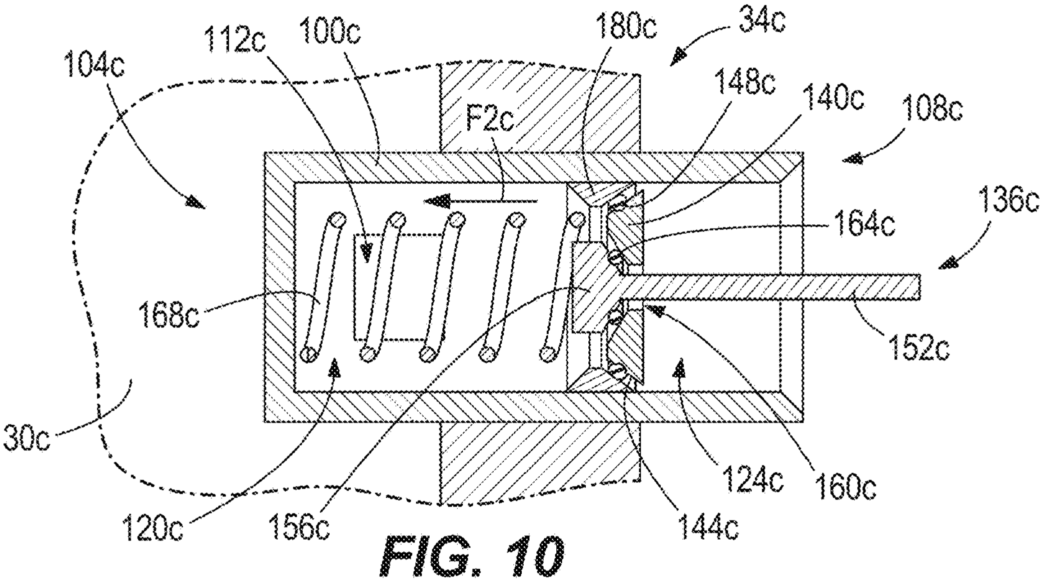
FIG. 10 is a section view of an integrated fill and pressure release valve according to yet another embodiment of the present disclosure.
Figure 11:
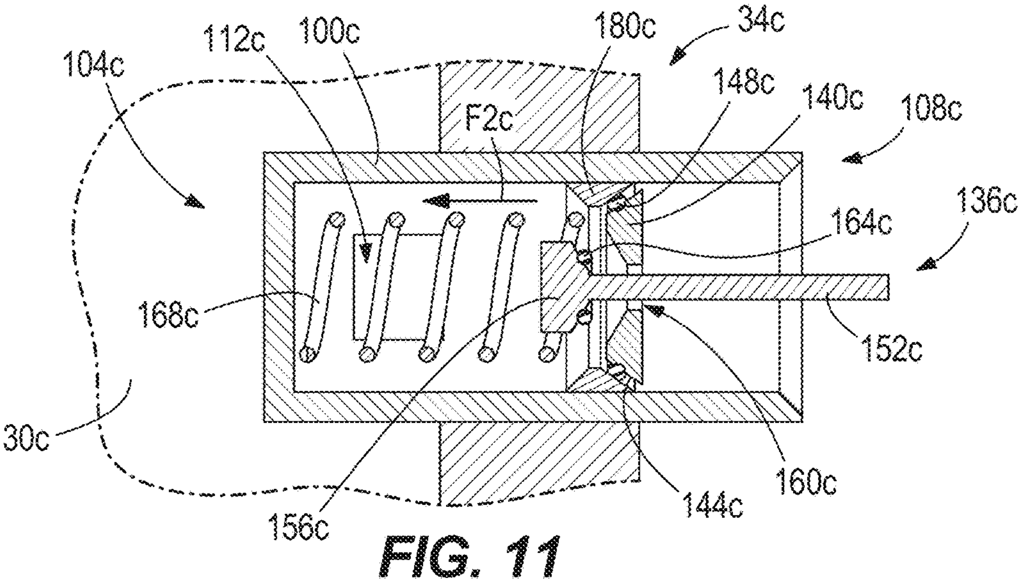
FIG. 11 illustrates the valve of FIG. 10 in a filling position.
Figure 12:
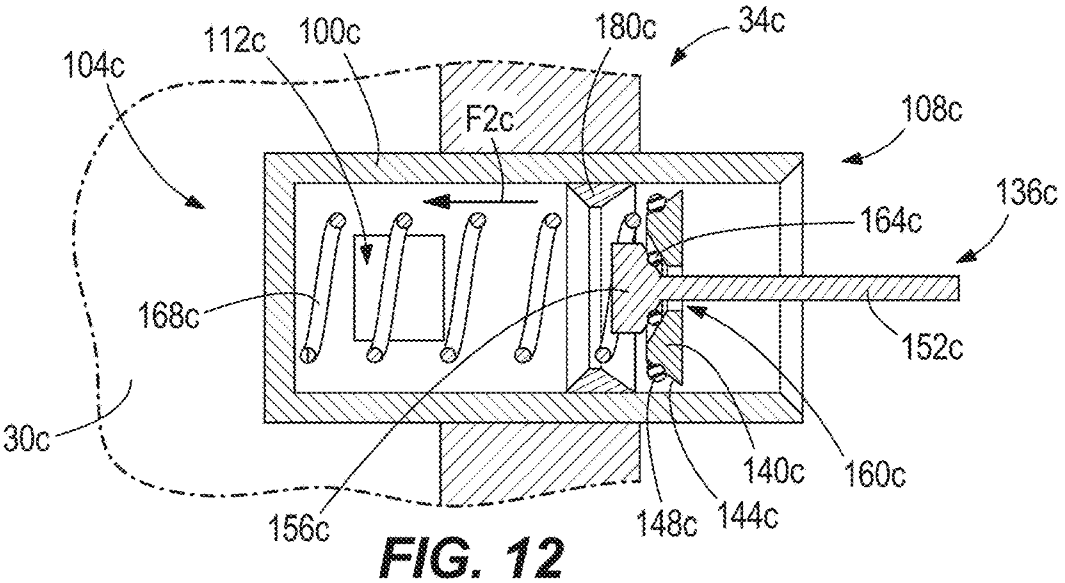
FIG. 12 illustrates the valve of FIG. 10 in an exhausting position.

FIGS. 10-12 illustrate a valve 34*c* according to yet another embodiment of the present disclosure, with like parts having like refence numerals plus the letter "c" appended thereon, and the following differences explained below. The sealed portion biasing member 168*c* is a tension spring acting on the outlet seal 140*c*. Like the ball-seat valve 34*b*, the inlet seal 136*c* is held in place due to pressure in the storage chamber 52*c*. The valve 34*c* does not include an atmospheric portion biasing member. Unlike the ball-seat valve 34*b*, the inlet seal 136*c* includes a stem 152*c* and protrusion 156*c*, like the double spring dual-action valve 34.

Figure 13:
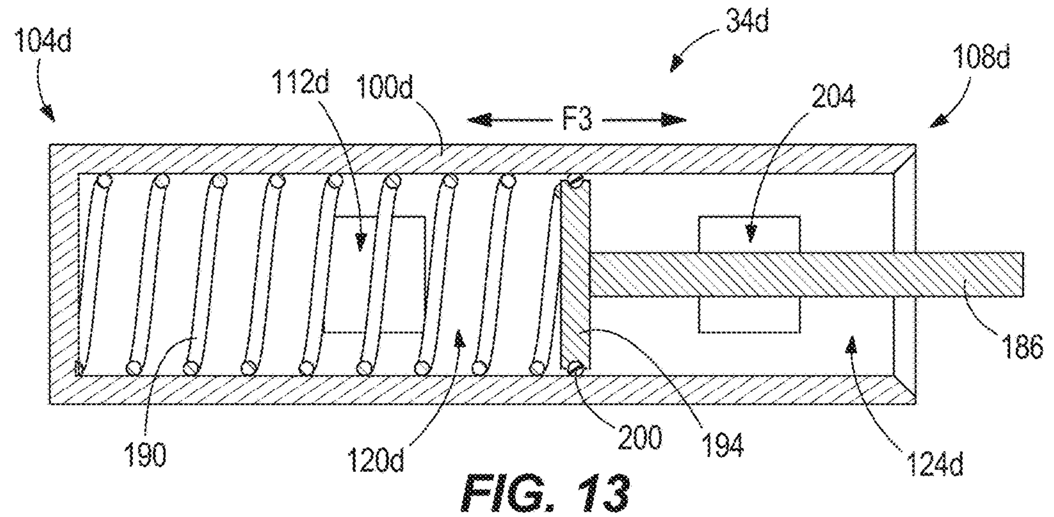
FIG. 13 is a section view of an integrated fill and pressure release valve according to yet another embodiment of the present disclosure.
Figure 14:
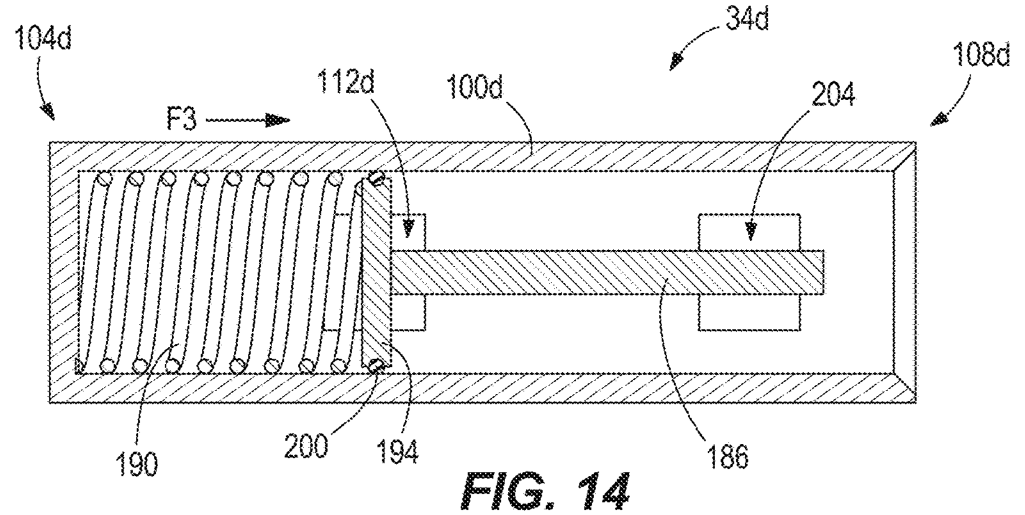
FIG. 14 illustrates the valve of FIG. 13 in a filling position.
Figure 15:
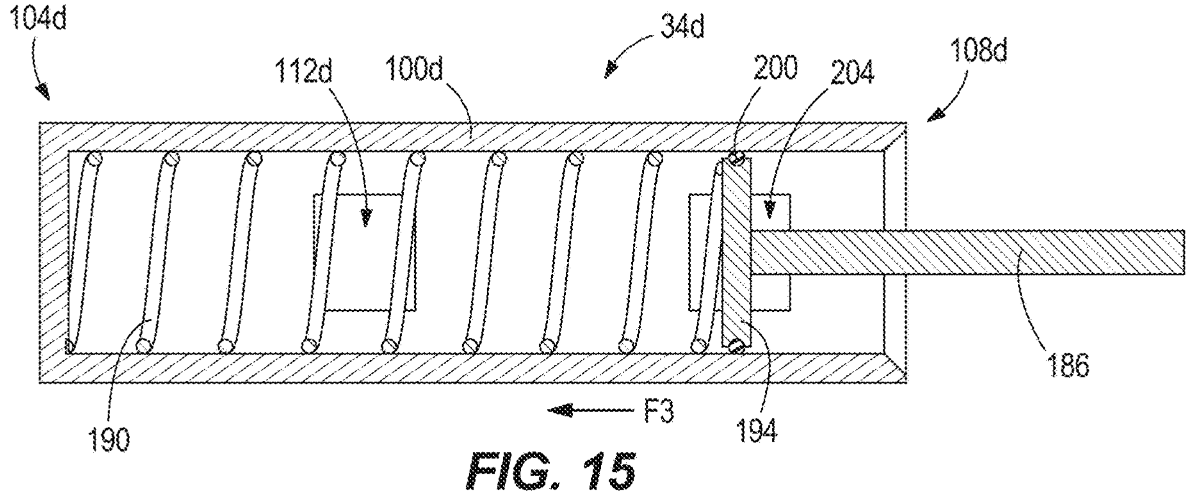
FIG. 15 illustrates the valve of FIG. 13 in an exhausting position.
Figure 16:
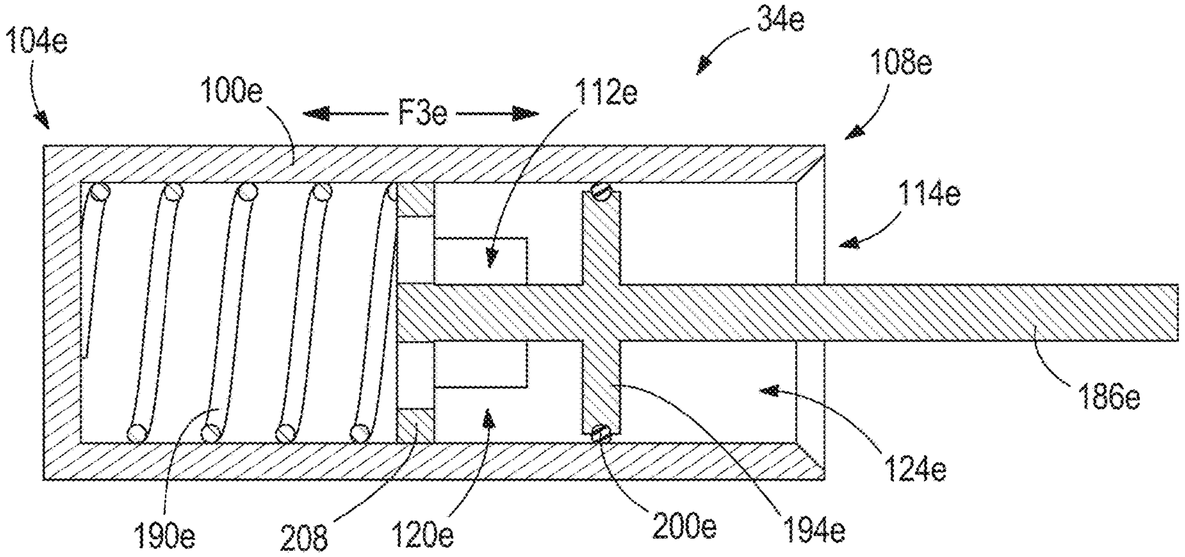
FIG. 16 is a section view of an integrated fill and pressure release valve according to yet another embodiment of the present disclosure.

FIGS. 13-15 illustrate a valve 34*d* according to yet another embodiment of the present disclosure, with like parts having like reference numerals plus the letter "d" appended thereon, and the following differences explained below. The valve 34*d* includes a single plunger 186 movable within the valve body 100*d* to control both gas flow into the storage chamber 52*d* and gas flow out of the storage chamber 52*d*. The plunger 186 is moveable between a sealing position (FIG. 13), a filling position (FIG. 14), and an exhausting position (FIG. 15). The plunger 186 is coupled to a biasing member 190, illustrated as a spring, on its interior end. The plunger 186 includes a sealing piston or disk 194 to sealingly engage the inner walls of the valve body 100*d* and separate the sealed portion 120*d* from the atmospheric portion 124*d*. In some embodiments, the sealing disk 194 includes a seal 200, such as an O-ring, disposed on a radially outer edge. The interior end 104*d* of the valve 34*d* includes at least one aperture 112*d* that allows for fluid communication between the storage chamber 52*d* and the interior of the valve body 100*d*. Similarly, the exterior end 108*d* includes at least one aperture 204 that allows for fluid communication between the atmosphere and the interior of the valve body 100*d*.

When the plunger 186 is located between the interior end and exterior end apertures 112*d*, 204, the valve 34*d* is sealed. To fill the storage chamber cylinder 30*d* with pressurized gas, the plunger 186 is moved toward the interior end 104*d* until it passes at least a portion of the interior end aperture 112*d* (FIG. 14). The storage chamber cylinder 30*d* is then in fluid communication with the atmosphere. In an overpressure situation, the pressure of the compressed gas moves the plunger 186 against the force of the spring 190 to a position beyond the aperture 204 of the exterior end 108*d* (FIG. 15), fluidly communicating the storage chamber 52*d* with the atmosphere to exhaust excessed compressed gas to atmosphere.

When the valve 34*d* is sealed (FIG. 13), the spring 190 is approximately at its natural length. Therefore, to fill the storage chamber cylinder 30, the compressed gas must overcome the biasing force F3 of the spring 190 in a first direction. Similarly, to exhaust gas from the storage chamber cylinder 30, the compressed gas must overcome the biasing force F3 of the spring 190 in a second direction opposite the first direction.

Figure 17:
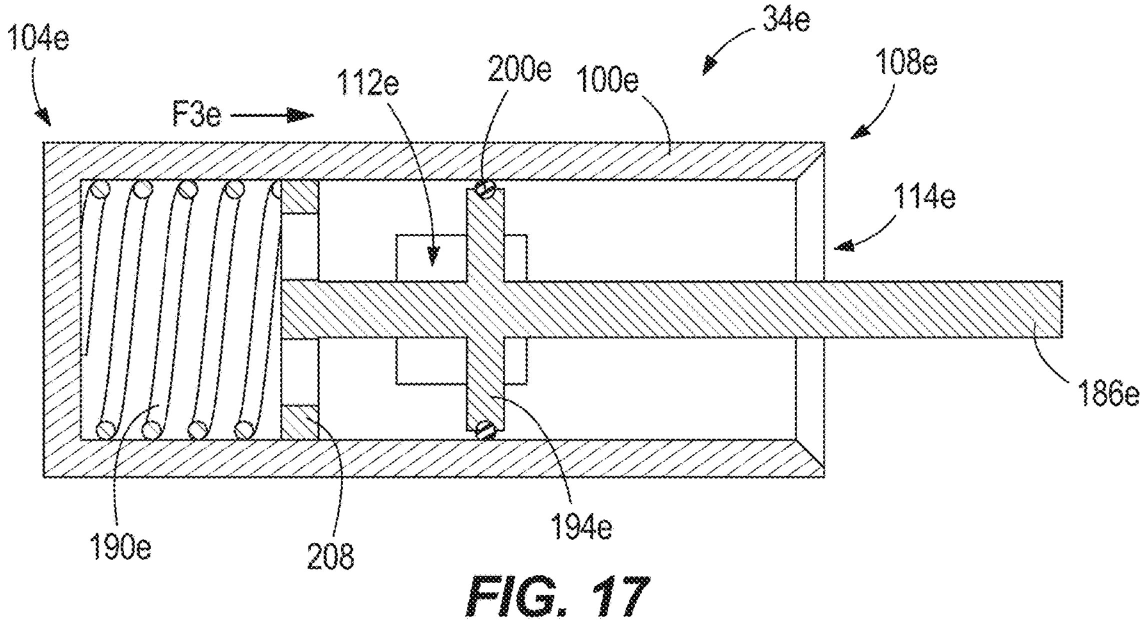
FIG. 17 illustrates the valve of FIG. 16 in a filling position.
Figure 18:
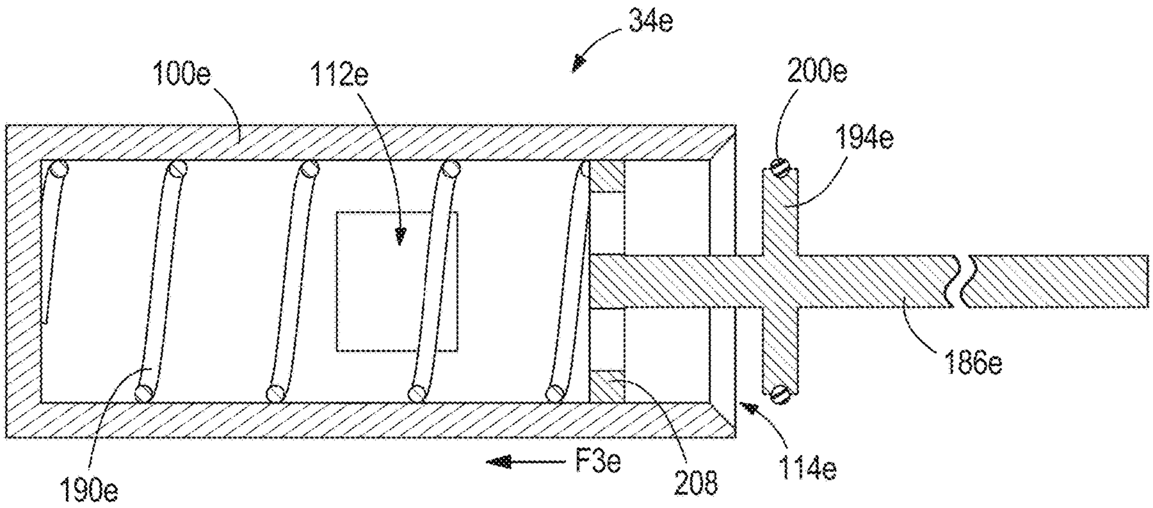
FIG. 18 illustrates the valve of FIG. 16 in an exhausting position.
Figure 19:
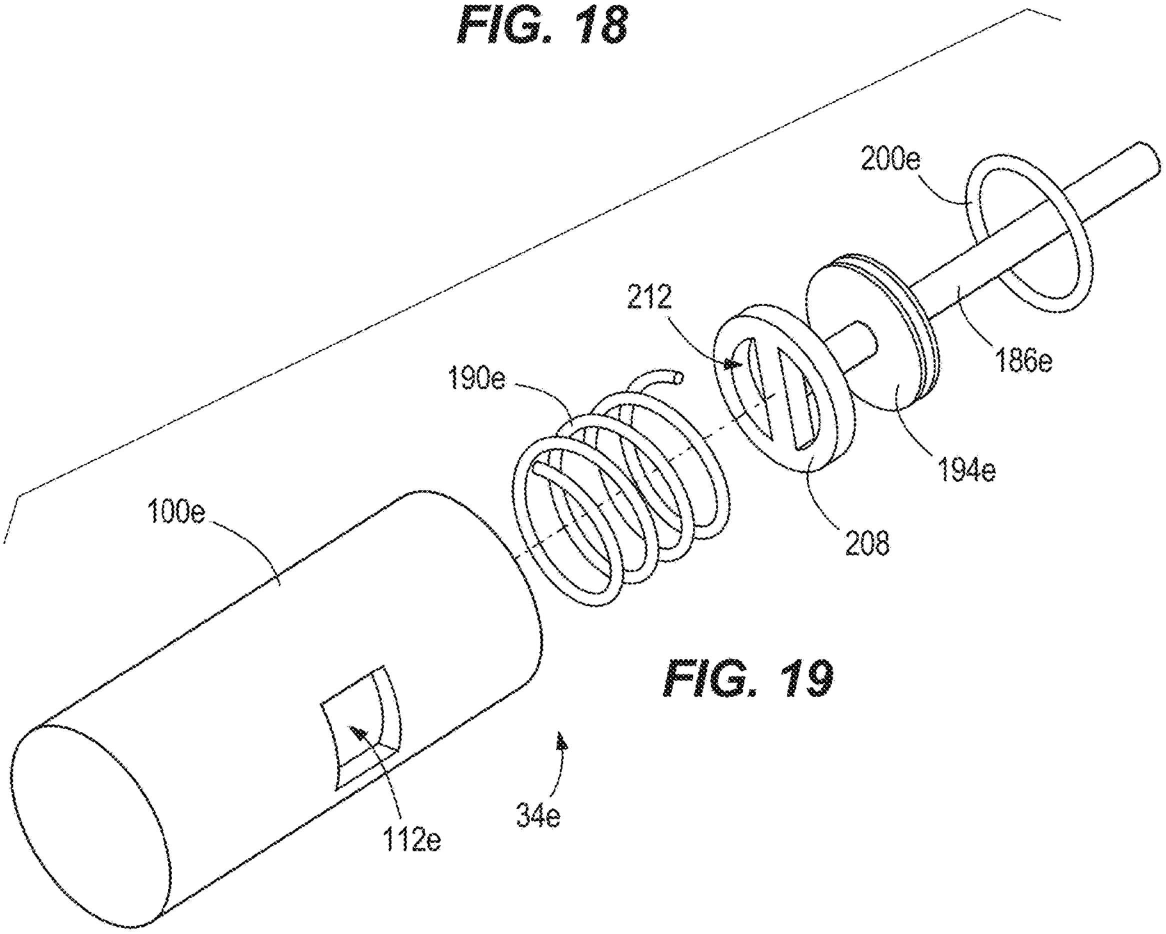
FIG. 19 is an exploded perspective view of the valve of FIG. 16.

FIGS. 16-19 illustrate a valve 34*e* according to yet another embodiment of the present disclosure, with like parts having like reference numerals plus the letter "e" appended thereon, and the following differences explained below. The valve body 100*e* includes an aperture 112*e* in fluid communication with the storage chamber 52*e*. The exterior end 108*e* includes an opening 114*e* that allows for fluid communication between the interior of the valve body 100*e* and the atmosphere. The plunger 186*e* includes a sealing disk 194*e* and a guide disk 208. The sealing disk 194*e* is solid and sealingly engages the inner walls of the valve body 100*e*. The guide disk 208 is disposed within the sealed portion 120*e* and includes an aperture 212 to allow gas to pass through the guide disk 208 (FIG. 19). The biasing member 190*e* is between the guide disk 208 and the valve body 100*e*.

To fill the storage chamber cylinder 30, the plunger 186*e* is depressed so that the sealing disk 194*e* exposes at least a portion of the aperture 112*e* (FIG. 17). To exhaust compressed gas from the cylinder 30, the plunger 186*e* is moved toward the exterior end 108*e* so the sealing disk 194*e* disengages from the interior walls (FIG. 18). In other words, the sealing disk 194*e* is positioned outside of the valve body 100*e* when the plunger 186*e* is in the exhausting position. The guide disk 208 remains within the valve body 100*e* to support the plunger 186*e* relative to the valve body 100*e*. Exhausted compressed gas flows out of the valve 34*e* though the aperture 212 in the guide disk 208.

Although the invention has been described in detail with reference to certain preferred embodiments, variations and modifications exist within the scope and spirit of one or more independent aspects of the invention as described.

Various features of the invention are set forth in the following claims.

What is claimed is:

1. A gas spring-powered fastener driver comprising:
a cylinder configured to contain a pressurized gas therein;
a piston disposed within and movable along the cylinder;
a driver blade attached to the piston and moveable therewith between a top-dead-center (TDC) position and a bottom-dead-center (BDC) position, the driver blade configured to drive a fastener when moved from the TDC position toward the BDC position; and
a two-way valve in fluid communication with the cylinder, the two-way valve configured to selectively permit an inbound flow of gas into the cylinder from an external pressurized gas source, permit an outbound flow of gas from the cylinder, and seal the cylinder to inhibit both inbound flow and outbound flow of gas from the cylinder;
wherein the two-way valve includes an interior end in fluid communication with the cylinder, an exterior end in selective fluid communication with the surroundings of the gas spring-powered fastener driver, and a sealing area disposed between the interior end and the exterior end.

2. The gas spring-powered fastener driver of claim 1, wherein the surroundings of the gas-spring powered fastener driver include the atmosphere surrounding the gas spring powered fastener driver.

3. The gas spring-powered fastener driver of claim 1, wherein the sealing area includes an inlet seal configured to selectively allow the inbound flow of gas, and wherein the sealing area includes an outlet seal configured to selectively allow the outbound flow of gas.

4. The gas spring-powered fastener driver of claim 3, wherein the two-way valve includes a valve body, and wherein the outlet seal selectively engages a portion of the valve body.

5. The gas spring-powered fastener driver of claim 3, wherein the outlet seal includes a central aperture, and wherein the inlet seal is configured to selectively engage the outlet seal to prevent the inbound flow of gas through the central aperture.

6. The gas spring-powered fastener driver of claim 3, wherein the two-way valve includes a first biasing member configured to bias the inlet seal towards a sealed position and a second biasing member configured to bias the outlet seal toward a sealed position.

7. A gas spring-powered fastener driver comprising:
a cylinder configured to contain a pressurized gas therein;
a piston disposed within and moveable along the cylinder;
a driver blade attached to the piston and moveable therewith between a top-dead-center (TDC) position and a bottom-dead-center (BDC) position, the driver blade configured to drive a fastener when moved from the TDC position toward the BDC position; and
a valve in fluid communication with the cylinder, the valve including
a valve body,
an inlet seal configured to selectively permit an inbound flow of gas from an external pressurized gas source into the cylinder, the inlet seal being biased toward a sealed position by pressurized gas within the cylinder, and
an annular outlet seal configured to selectively permit an outbound flow of gas from the cylinder, the outlet seal being biased toward a sealed position by a compression spring;
wherein a radially outer edge of the annular outlet seal is engaged with the valve body when the outlet seal is in the sealed position, and
wherein the inlet seal is engaged with the annular outlet seal when the inlet seal is in the sealed position.

8. The gas spring-powered fastener driver of claim 7, wherein the inlet seal is spherical.

9. The gas spring-powered fastener driver of claim 8, wherein the annular outlet seal defines a central aperture therein and the spherical inlet seal is biased towards a sealed position closing the central aperture by pressure of the compressed gas within the cylinder.

10. The gas spring-powered fastener driver of claim 7, wherein the annular outlet seal defines a central aperture therein, and in the sealed position of the inlet seal, the inlet seal closes the central aperture.

11. The gas spring-powered fastener driver of claim 10, further comprising an inlet seal biasing member biasing the inlet seal and an outlet seal biasing member biasing the outlet seal.

12. The gas spring-powered fastener driver of claim 10, wherein the inlet seal includes a stem extending through the central aperture of the annular outlet seal.

13. The gas spring-powered fastener driver of claim 12, wherein the valve includes an interior end in fluid communication with the cylinder and an exterior end in selective fluid communication with the surroundings of the gas spring-powered fastener driver, and the stem extends beyond the exterior end.

14. A gas spring-powered fastener driver comprising:

a cylinder configured to contain a pressurized gas therein;

a piston disposed within and movable along the cylinder;

a driver blade attached to the piston and moveable therewith between a top-dead-center (TDC) position and a bottom-dead-center (BDC) position, the driver blade configured to drive a fastener when moved from the TDC position toward the BDC position; and a valve coupled to the cylinder, the valve including a plunger moveable between a sealed position, a filling position in which an inbound flow of gas is permitted into the cylinder, and an exhausting position in which an outbound flow of gas is permitted from the cylinder.

15. The gas spring-powered fastener driver of claim 14, wherein the valve includes an interior end having at least one aperture in fluid communication with the pressurized gas contained within the cylinder and an exterior end having at least one aperture in fluid communication with the atmosphere, and wherein the plunger is disposed between the interior end and the exterior end when in the sealed position.

16. The gas spring-powered fastener driver of claim 14, wherein the valve includes a biasing member configured to bias the plunger toward the sealed position.

17. The gas spring-powered fastener driver of claim 16, wherein the biasing member is a spring, and wherein the spring is configured to apply a first biasing force on the plunger when the plunger is in the filling position and a second biasing force on the plunger when the plunger is in the exhausting position, the second biasing force being oriented in a direction opposite the first biasing force.

18. The gas spring-powered fastener driver of claim 14, wherein the valve includes a cylindrical valve body, and wherein the plunger includes a sealing disk and a sealing ring disposed about the sealing disk, the sealing ring configured to engage an interior surface of the cylindrical valve body.

19. The gas spring-powered fastener driver of claim 18, wherein the valve body includes an aperture in fluid communication with the pressurized gas contained within the cylinder, wherein the valve body includes an opening in an axial end face of the valve body, the opening configured to be in fluid communication with the atmosphere, and wherein the plunger is disposed between the aperture and the opening when in the sealed position.

20. The gas spring-powered fastener driver of claim 19, wherein the sealing disk is positioned outside of the valve body when the plunger is in the exhausting position, and wherein the plunger includes a guide disk configured to remain within the valve body when the plunger is in the exhausting position to support the plunger relative to the valve body.

* * * * *